United States Patent
Dai et al.

(10) Patent No.: US 9,902,094 B2
(45) Date of Patent: Feb. 27, 2018

(54) METHOD OF FORMING FILM FOR A COMPONENT

(71) Applicant: HON HAI PRECISION INDUSTRY CO., LTD., New Taipei (TW)

(72) Inventors: Feng-Yuen Dai, New Taipei (TW); Jih-Chen Liu, New Taipei (TW); Hung-Lien Yeh, New Taipei (TW); Han-Lung Lee, New Taipei (TW); Hung-Chun Ma, New Taipei (TW); Shun-Chi Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 342 days.

(21) Appl. No.: 14/688,341

(22) Filed: Apr. 16, 2015

(65) Prior Publication Data

US 2016/0089819 A1  Mar. 31, 2016

(30) Foreign Application Priority Data

Sep. 30, 2014  (TW) .............................. 103133853 A

(51) Int. Cl.
  *B29C 39/10*  (2006.01)
  *B29C 33/00*  (2006.01)
  *B29C 35/08*  (2006.01)

(52) U.S. Cl.
  CPC .......... *B29C 39/10* (2013.01); *B29C 35/0888* (2013.01); *B29C 2033/0005* (2013.01); *B29C 2035/0827* (2013.01); *B29C 2791/006* (2013.01)

(58) Field of Classification Search
  CPC ................ B29C 39/00; B29C 35/0888; B29C 2033/0005; B29C 2035/0827; B29C 2791/006
  See application file for complete search history.

(56) References Cited

U.S. PATENT DOCUMENTS

2013/0278845 A1* 10/2013 Pishnyak ............ B29C 35/0805
349/12

FOREIGN PATENT DOCUMENTS

FR  2936440 A1 *  4/2010  ......... B29C 45/1418

* cited by examiner

*Primary Examiner* — Jacob T Minskey
*Assistant Examiner* — Melody Tsui
(74) *Attorney, Agent, or Firm* — ScienBiziP, P.C.

(57) ABSTRACT

A method of forming a film on a component includes providing a curing device. The curing device includes a grooved receiving die, a suction device, and a UV curing system. The suction device vacuum-lifts the component into the groove and a gap between the component and the groove is thus created. A vacuum is created in the gap and a UV curing glue is injected into the gap, the UV curing glue being selected from a monomer, an oligomer, and a photoinitiator. The UV curing glue is cured by the UV curing system and the component with a cured film is easily demolded.

4 Claims, 5 Drawing Sheets

METHOD OF FORMING FILM FOR A COMPONENT

FIELD

The subject matter herein generally relates to a method of forming protective films.

BACKGROUND

A protective film is generally sprayed on a component used in consumer electronics.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Implementations of the present technology will now be described, by way of example only, with reference to the attached figures.

DETAILED DESCRIPTION

Figure 1:
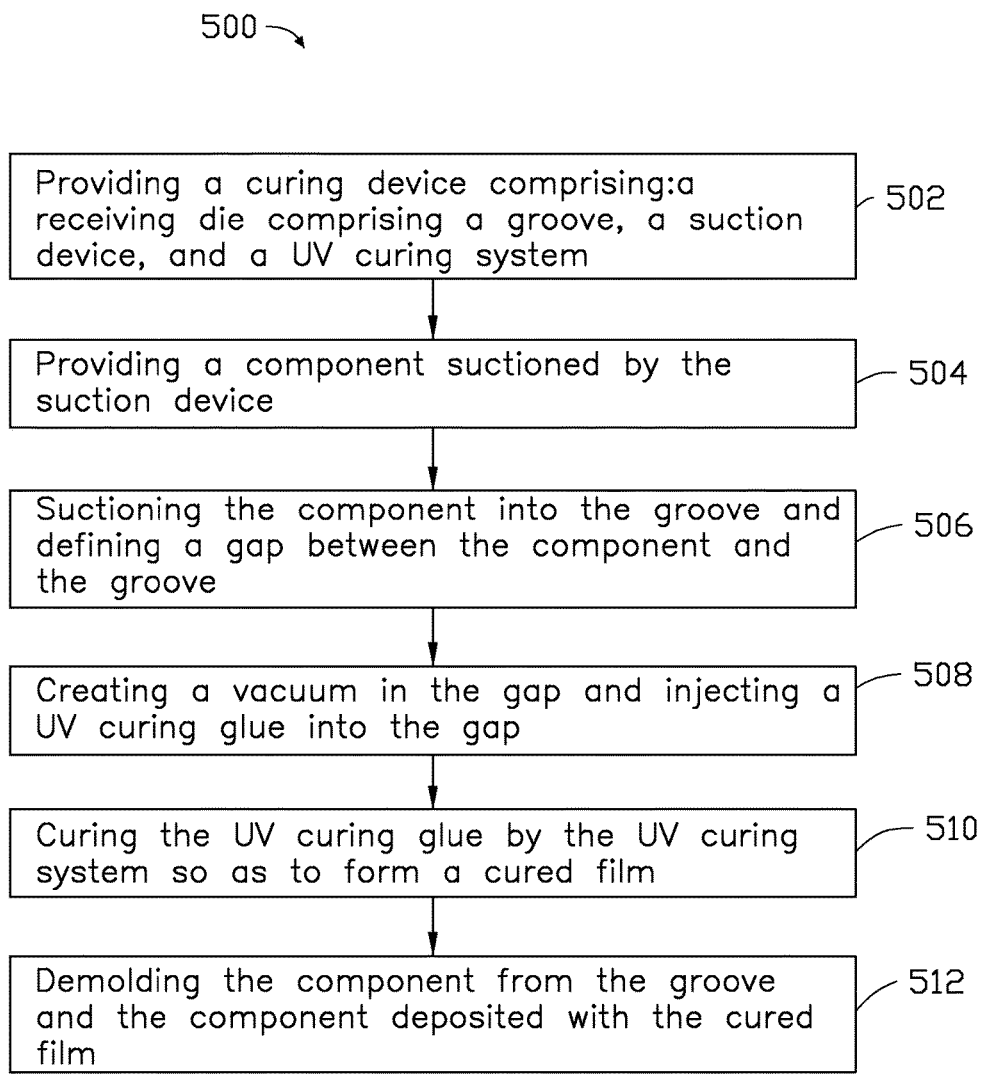
FIG. 1 is a flow chart of a method of forming protective films for a component, according to the present embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The present disclosure relates to a method of forming films for protection or otherwise on a component.

Referring to FIG. 1, a flowchart is presented in accordance with an example embodiment which is being thus illustrated. An example method 500 is provided by way of example, as there are a variety of ways to carry out the method. The method 500 described below can be carried out using the configurations illustrated in FIGS. 2, 3, 4, and 5, for example, and various elements of these figures are referenced in explaining example method 500. Each block shown in FIG. 1 represents one or more processes, methods, or subroutines, carried out in the example method 500. Additionally, the illustrated order of blocks is by example only and the order of the blocks can change. The example method 500 can begin at block 502.

At block 502, a curing device 10 is provided, the curing device 10 includes a receiving die 111, a suction device 112, and a ITV curing system 12, the receiving die 111 including a groove 1113.

At block 504, a component 20 is provided and the suction device 112 vacuum-lifts the component 20.

At block 506, the component 20 is suctioned into the groove 1113 and a gap 21 between the component 20 and the groove 1113 is thus defined.

At block 508, a vacuum is created in the gap 21 and a UV curing glue 30 is injected into the gap 21.

At block 510, the UV curing system 12 emits a UV light onto and through the receiving die 111 to cure the UV curing glue 30 so as to form the cured film 40.

At block 512, the component 20 is demolded from the groove 1113 and deposited out with the cured film 40.

Figure 2:
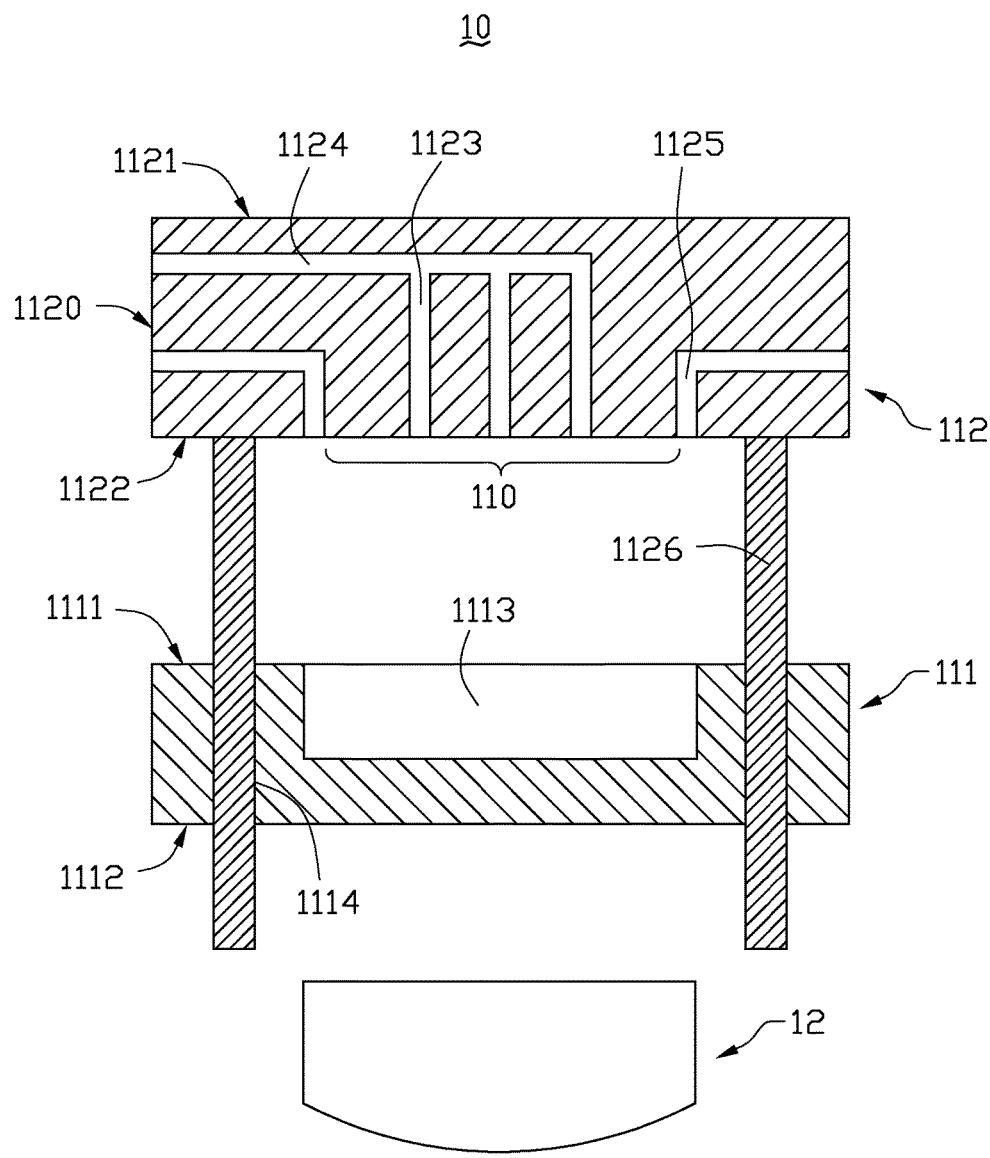
FIG. 2 is a diagrammatic, cross sectional view of the method of forming films of FIG. 1.

The cross sectional view of the curing device 10 is shown in FIG. 2. The receiving die 111 is formed by transparent materials including plastic and glass that can allow UV light to pass through. The receiving die 111 includes a first surface 1111, a second surface 1112 opposite to the first surface 1111, and a plurality of locating holes 1114 throughout the receiving die 111 from the first surface 1111 to the second surface 1112. The groove 1113 is defined in the first surface 1111. In other embodiments, a plurality of grooves 1113 can be defined in the first surface 1111 to correspond to a plurality of components 20. The shape of the groove 1113 is similar to that of the component 20 and the size of the groove 1113 is larger than that of the component 20. In the embodiment, the shape of the groove 1113 and that of the component 20 are both cuboid. The surfaces of the component 20 that correspond to the surfaces of the groove 1113 can be coated with the cured film 40. The surfaces of the groove 1113 include a demolding layer formed by coating or spray painting and configured to allow easy demolding of the component 20 complete with the cured film 40. The shape of the groove 1113 and the component 20 are not limited to being cuboid. In other embodiment, the surfaces of the groove 1113 can have no demolding layer. The adhesive force between the UV curing glue 30 and the component 20 is stronger than the adhesive force between the UV curing glue 30 and the receiving die 111 including a demolding layer.

The suction device 112 includes a top surface 1121, a bottom surface 1122 opposite to the top surface 1121, two side surfaces 1120 interconnected between the top surface 1121 and the bottom surface 1122, and a plurality of suction holes 1123. A suction channel 1124 is connected to the suction holes 1123, and there are two injecting channels 1125 configured to inject the LTV curing glue 30. A plurality of locating columns 1126 is positioned on the bottom surface 1122 to correspond to the locating holes 1114. The bottom surface 1122 defines an area 110, the shape of the area 110 corresponding to that of the component 20. The suction holes 1123 are defined in the area 110 of the bottom surface 1122 and pass through into the suction device 112. The suction channel 1124 penetrates the side surface 1120 and further is connected to a first vacuum pump (not shown) configured to draw air from the suction holes 1123. Each injecting channel 1125 passes through the suction device 112 from the bottom surface 1122 to the side surface 1120 and behind the area 110. The injecting channel 1125 is further connected to a second vacuum pump (not shown) and an injecting device (not shown). The injecting channel 1125 is configured to both draw air and inject the UV curing glue 30 into the groove 1113. The suction channel 1124 and the injecting channel 1125 are defined through the side surface 1120 instead of through the top surface 1121. In other embodiments, a plurality of the areas 110 can correspond to a plurality of the grooves 1113.

The UV curing system 12 can emit a UV light and is configured to cure the UV curing glue 30.

Figure 3:
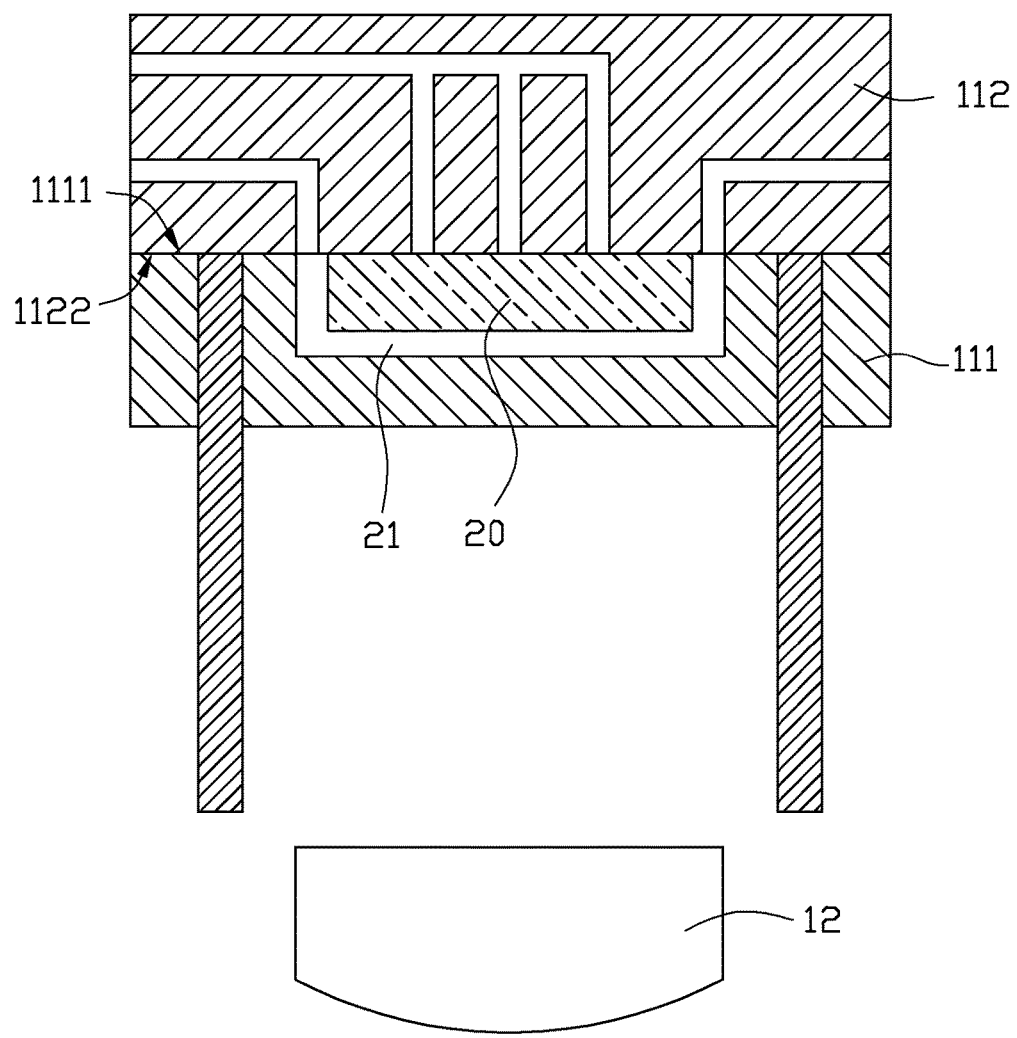
FIG. 3 is a diagrammatic, cross sectional view of the method of forming films illustrating a coupling between a suction device and a receiving die of FIG. 1.

The component 20 positioned between the suction device 112 and the receiving die 111 is shown in FIG. 3. When the suction device 112 is to vacuum-lift the component 20 to the area 110, the suction channel 1124 draws air from the suction holes 1123, and the component 20 correctly aligns with the area 110. The locating columns 1126 are inserted into the locating holes 1114 and the receiving die 111 connects to the suction device 112. The component 20 is suctioned into the groove 1113 and so defines a gap 21 between the component 20 and the groove 1113 when the bottom surface 1122 is correctly aligned with the first surface 1111 of the receiving die 111. The injecting channel 1125 corresponds to the gap 21, and the width of the gap 21 is the same as the thickness of the cured film 40. In other embodiments, the receiving die 111 connects to the suction device 112 by a connecting device including a snap-in fixture without the locating columns 1126 and the locating holes 1114.

Figure 4:
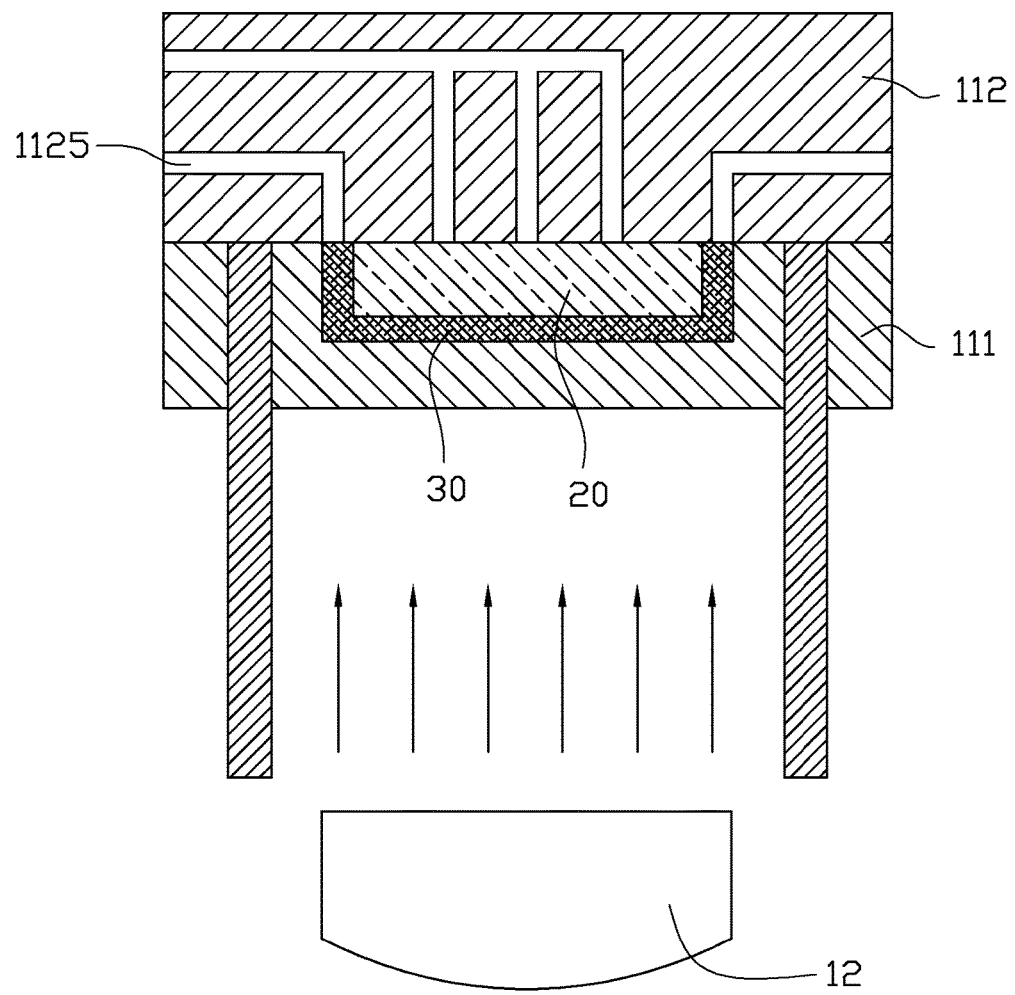
FIG. 4 is a cross sectional view of the method of forming films of FIG. 1 to cure a UV curing glue after injecting the UV curing glue.

The injecting channels 1125 draw air to create a vacuum in the groove 1113. Then the UV curing glue 30 is injected into the gap 21 through the injecting channels 1125. The UV curing system 12 cures a UV curing glue after injecting the UV curing glue 30, as shown in FIG. 4. As a vacuum is created in the gap 21, the UV curing glue 30 injected into the gap 21 fills the gap quickly and uniformly. Furthermore, no air bubble is formed in the gap 21. The UV curing glue 30 can be selected from a monomer, an oligomer, and a photoinitiator, and the adhesive force between the UV curing glue 30 and the component 20 is stronger than the adhesive force between the UV curing glue 30 and the receiving die 111. The UV curing system 12 emits a UV light to the receiving die 111, the light passes through the receiving die 111 to cure the UV curing glue 30 so as to form the cured film 40. In other embodiments, the suction device 112 includes a dispensing device to inject the UV curing glue 30 without the injecting channel 1125, and the size of the bottom surface 1122 of the suction device 112 is smaller than the size of the groove 1113.

Figure 5:
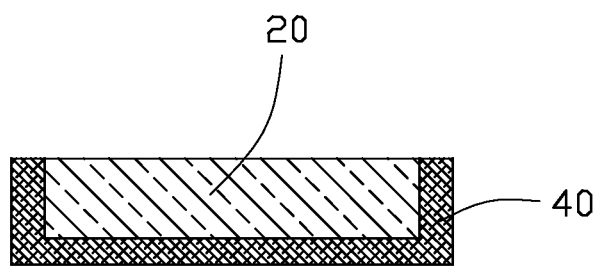
FIG. 5 is a cross sectional view of the method of forming films of FIG. 1 illustrating the cured film after demolding a component from a groove.

The component 20 is coated with the cured film 40 is shown in FIG. 5. The component 20 is demolded from the groove 1113 with a cured film 40 deposited on the surfaces of the component 20.

The embodiments shown and described above are only examples. Many details are often found in the art such as the other features of a method of forming films for a component, Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of forming a film for a component comprising:
   providing a curing device, the curing device comprising:
      a receiving die comprising a groove, wherein the receiving die is formed by a transparent material;
      a suction device connected to a vacuum pump, wherein the suction device comprises a top surface, and a bottom surface opposite to the top surface, the bottom surface has an area corresponding to the groove, a shape of the area of the bottom surface corresponds to a shape of the component, the suction device further comprises a plurality of suction holes and a suction channel connected to the plurality of suction holes, the plurality of suction holes is defined in the area of the bottom surface and through into the suction device, the suction channel is configured to draw air from the plurality of suction holes, the suction device further comprises an injecting channel configured to draw air and to injection a UV curing glue, the injecting channel passes through the suction device from the bottom surface to a side surface and behind the area; and
      an ultra violet (UV) curing system;
   providing the component;
   suctioning the component, by the suction device, into the groove, to cause the component to close the plurality of section holes and a gap to be defined between the component and the groove;
   creating, by the vacuum pump, a vacuum in the gap by drawing air from the injection channel aligned with the gap, and injecting the UV curing glue through the injection channel into the gap, the UV curing glue selected from a group consisting of a monomer, an oligomer, and a photoinitiator, wherein an adhesive force between the UV curing glue and the component is greater than an adhesive force between the UV curing glue and the receiving die;
   curing the UV curing glue by the UV curing system to form a cured film; and
   demolding the component from the groove and the component deposited with the cured film.

2. The method of forming a film for a component in accordance with claim 1, wherein a width of the gap is the same as a thickness of the cured film.

3. The method of forming a film for a component in accordance with claim 1, wherein the receiving die comprises a first surface, a second surface opposite to the first surface, and a plurality of locating holes, the groove of the receiving die is defined in the first surface, the plurality of locating holes throughout the receiving die from the first surface to the second surface, the suction device comprises a plurality of locating columns position on the bottom surface and corresponds to the plurality of locating holes, the plurality of locating columns is inserted into the plurality of locating holes and the bottom surface of the suction device aligns with the first surface of the receiving die.

4. The method of forming a film for a component in accordance with claim 1, wherein the transparent material comprises plastics and glasses.

* * * * *